United States Patent [19]

Shannon

[11] Patent Number: 5,268,679
[45] Date of Patent: Dec. 7, 1993

[54] OPTICAL DATA PROCESSING DEVICE

[75] Inventor: John M. Shannon, Whyteleafe, England

[73] Assignee: U.S. Philips Corporation, New York, N.Y.

[21] Appl. No.: 708,606

[22] Filed: May 31, 1991

[30] Foreign Application Priority Data

Jun. 29, 1990 [GB] United Kingdom ............... 9014504

[51] Int. Cl.$^5$ .................... G09G 3/36; G02F 1/13; G06G 9/00
[52] U.S. Cl. ................................. 345/4; 359/72; 364/822; 345/92; 345/207
[58] Field of Search ............ 364/713, 822, 837, 845, 364/841; 359/53, 72, 73, 79, 107, 108, 15, 41, 58–60; 340/784, 783, 793, 779, 716, 717; 250/214 LS

[56] References Cited

U.S. PATENT DOCUMENTS

| | | | |
|---|---|---|---|
| 4,351,589 | 9/1982 | Chavel et al. | 359/72 |
| 4,557,563 | 12/1985 | Sprague | 340/783 |
| 4,679,909 | 7/1987 | Hamada et al. | 359/79 |
| 4,764,891 | 8/1988 | Grinberg et al. | 364/713 |
| 4,772,101 | 9/1988 | Liu | 359/54 |
| 4,800,519 | 1/1989 | Grinberg | 364/822 |
| 4,908,702 | 3/1990 | Chao et al. | 340/716 |
| 4,937,776 | 6/1990 | Myers et al. | 364/713 |
| 4,988,891 | 1/1991 | Mashiko | 364/713 |
| 5,051,570 | 9/1991 | Tsujikawa et al. | 359/72 |
| 5,056,897 | 10/1991 | Akiyama et al. | 359/72 |
| 5,063,531 | 11/1991 | Kawai et al. | 364/822 |
| 5,071,231 | 12/1991 | Armitage et al. | 359/53 |

FOREIGN PATENT DOCUMENTS 0109832 5/1984 European Pat. Off. .
WO8605607 9/1986 PCT Int'l Appl. .

OTHER PUBLICATIONS

F. T. S. Yu and S. Jutamulia, "Optical Parallel Logic Gates Using Inexpensive Liquid-Crystal Televisions", Optics Letters, vol. 12, No. 12, Dec. 1987, pp. 1050–1052.

F. T. S. Yu, S. Jutamulia and D. A. Gregory, "Real-Time Liquid Crystal TV XOR- and XNOR-Gate Binary Image Subtraction Technique", Applied Optics, vol. 26, No. 14, Jul. 15, 1987, pp. 2738–2742.

*Primary Examiner*—Alvin E. Oberley
*Assistant Examiner*—Steven J. Saras
*Attorney, Agent, or Firm*—Leroy Eason

[57] ABSTRACT

An optical data processing device has successive light intensity modulating levels, each level including a matrix of cells (35), each cell having therein an element (31) of electrically controllable light transmissivity and a control device (32) which is responsive to signals supplied thereto to control the transmissivity of the element (31) in accordance with such signals. The matrix cells in at least one level also each include a light responsive element (34), such as a photodiode, for controlling the pattern of transmissivities at that level in accordance with the light received from the preceding level, thereby permitting optical as well as electrical modulation of the input image, formed at the first level. The final level (n) includes a display screen which, when an input light beam is incident on the first level, produces an output image corresponding to the input image as modified by the sequence of levels in accordance with the supplied data signals. Since there may typically be 350,000 matrix cells in each level, very high parallel data processing capability is achieved.

8 Claims, 3 Drawing Sheets

OPTICAL DATA PROCESSING DEVICE

BACKGROUND OF THE INVENTION

This invention relates to an optical data processing device.

In recent years there has been considerable interest in the area of optical data processing and/or optical computing, particularly because the properties of light make it especially suitable for parallel processing of data or information. In addition, there is much interest in developing so-called neural networks, effectively computing devices which seek to emulate the functioning of the human brain.

Various papers by Francis T. S. Yu and colleagues, for example a paper entitled 'Optical parallel logic gates using inexpensive liquid crystal televisions' published in Optics Letters Vol. 12, No. 12, December 1987 at pages 1050 to 1052 and a paper entitled 'Real-time liquid crystal TV XOR and XNOR gate binary image subtraction technique' published in Applied Optics Vol. 26, No. 14, 15 Jul. 1987 at pages 2738 to 2742 discuss the use of liquid crystal display devices or televisions for forming optical logic devices.

SUMMARY OF THE INVENTION

According to the present invention, there is provided an optical data processing device having a first light modulating level comprising a substrate carrying a matrix of elements each having a controllable light transmissivity, and means responsive to input data signals for controlling the transmissivity of the individual light transmissive elements to store at the first level a transmissivity pattern which, when an operating light beam is incident on the first level, forms an input two-dimensional image representing the input data signals. A sequence of further light modulating levels are provided following the first level, each further light modulating level comprising a substrate carrying a matrix of further controllable light transmissive elements and each further level having means for enabling the light transmissivity of separate light transmissive elements of that further level to be controlled, at least one of the light modulating levels comprising light responsive elements for modifying the light transmissivity of the light transmissive elements in response to light incident on that level, and the final further light intensity modulating level comprising a display screen for displaying, when the operating light beam is incident on the first level, an output two-dimensional image derived from the input two-dimensional image as modified by the sequence of light intensity modulating levels.

An optical data processing device in accordance with the invention thus has a series of light modulating levels provided one on top of another, with each light modulating level having a matrix of elements of controllable light transmissivity and with at least one of the light modulating levels comprising light responsive elements for modifying the light transmissivity of the light transmissive elements in response to light incident on that level. Thus input data signals which may be supplied to the first level as optical or electrical signals can be modified to produce at the final further level a modified optical image which may be displayed or further processed.

The device thus enables input data signals to be altered or modified using parallel processing techniques within a single device, and moreover enables the modification resulting from the at least one level to be determined by the light incident on that level. This allows, for example, arrangements in which the output two-dimensional image can be fed back to provide the input data signals. Such arrangement enables interaction by an operator to control the modifications made to the input data signals.

Generally, the light transmissive elements are liquid crystal elements, although other suitable elements having electrically and/or optically controllable light transmission properties may be used.

Conveniently, at least one of the light modulating levels may have means for electrically addressing individual light transmissive elements for controlling the light transmissivity of separate light transmissive elements of that level so enabling, in respect of that level, electrical control of the modification of the input data signals.

Each light transmissive element of the first level may have associated therewith a respective light responsive element and means may be provided for causing the pattern to be stored at the first level in response to an input light beam incident on that level, so enabling the input data signal to be stored as an optical image. At least one further level may have at least one light responsive element for modulating the light transmissivity of one or more of the transmissive elements of that level in response to the light incident on that level.

In one example, at least one further level may have a group of light responsive elements for providing a signal to modulate the light transmissivity of at least one light transmissive element of that level in response to the light incident on the group of light responsive elements.

Such at least one further level may comprise light responsive elements associated with the light transmissive elements and means for providing a signal to modulate the light transmissivity of a further light transmissive element of that level in response to the light received by the light responsive elements associated with adjacent light transmissive elements. The at least one further level may have at least one light transmissive element associated with a light responsive element and means may be provided for controlling the transmissivity of the said at least one light transmissive element in response only to the light incident on the said light responsive element.

The or each light responsive element may comprise a photodiode formed at the associated level. Each level may comprise a matrix of cells. Each cell may comprise a controllable light transmissive element and an area of predetermined transmissivity for allowing passage of the operating light beam. A deflection layer, for example a birefringent layer, may be provided between selected further levels for deflecting the portion of the operating light beam passing through the area of predetermined transmissivity of a matrix cell onto the light transmissive element of the corresponding matrix cell of the next further level, thereby enabling a refresh of the pattern being modified and thus increasing the maximum possible number of levels and different modification steps. A light sensing level comprising light responsive elements may be provided between one selected further level and the deflection layer for sensing a pattern stored at the one selected level and for providing data signals to the light transmissivity control elements of the other selected further level for enabling the pattern stored at the one selected further level to be reproduced at the other selected further level. The data signals are conveniently supplied electrically from the one to the other selected further level and may if desired be modified so as to modify the pattern stored at the other selected further level.

BRIEF DESCRIPTION OF THE DRAWINGS

Embodiments of the invention will now be described, by way of example, with reference to the accompanying drawings, in which.

It should, of course, be appreciated that the Figures are merely schematic and are not drawn to scale. In particular, the thicknesses of layers may have been relatively exaggerated in the interests of clarity.

DESCRIPTION OF THE PREFERRED EMBODIMENTS

Figure 2:
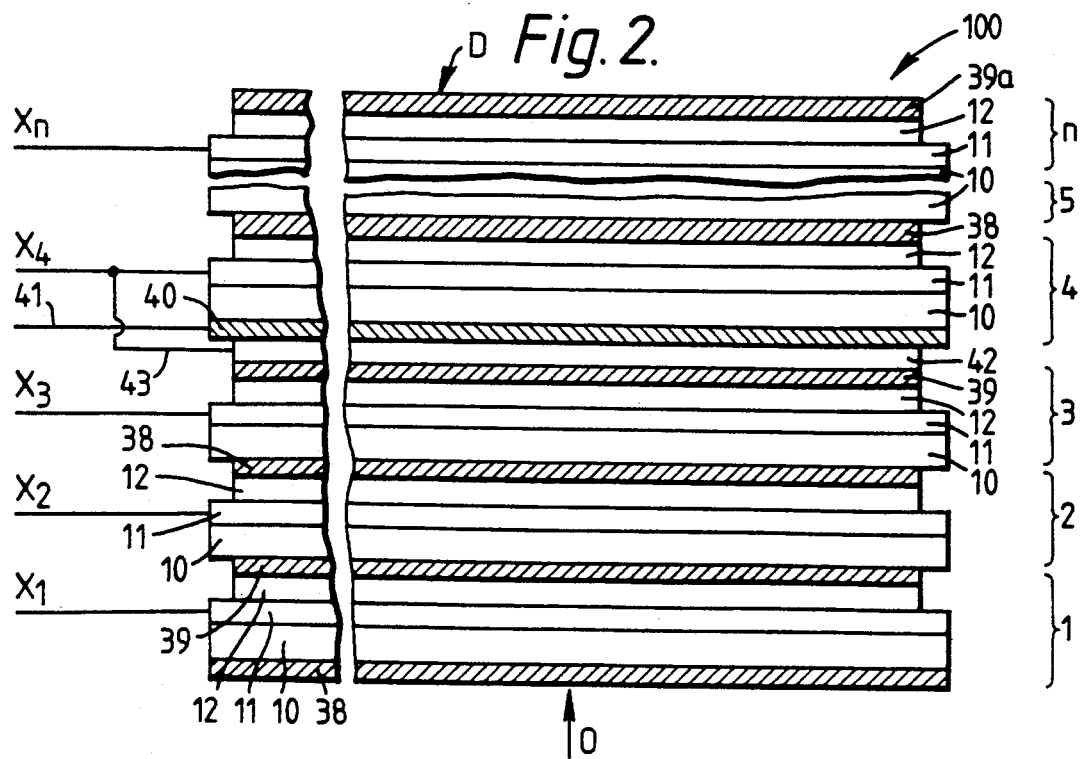
FIG. 2 is a schematic simplified cross-sectional view, part broken away of an optical data processing device in accordance with the invention.
Figure 3:
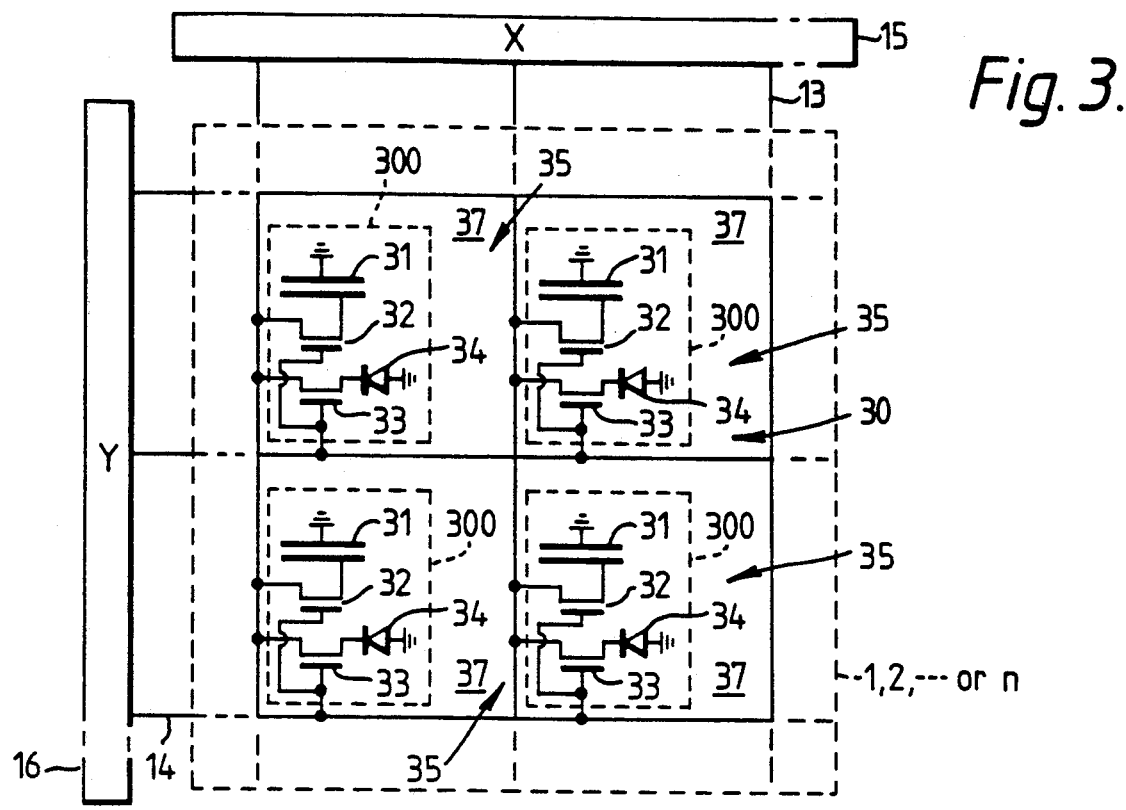
FIG. 3 is a schematic circuit diagram of one form of a further light modulating level and associated control circuitry of a data processing device in accordance with the invention.

Referring now to the drawings, there is illustrated in FIG. 2 an optical data processing device 100 comprising a first light intensity modulating level 1 having a substrate 10 carrying, as illustrated by way of an example in FIG. 3, a matrix 30 of elements 31 each having a controllable light transmissivity, and means 32,33,34 responsive to input data signals for controlling the transmissivity of the individual light transmissive elements 31 to store at the first level 1 a pattern which, when an operating light beam 0 is incident on the first level 1, forms an input two-dimensional image at the first level 1 representing the input data. A sequence of further light modulating levels 2,3,4,5, ... n (see FIG. 2) each also comprise a substrate 10 carrying a matrix 30 of further controllable light transmissive elements 31, each further level 2,3,4,5 ... n having means 32,33,34, (see FIG. 3) for enabling the light transmissivity of separate further elements of that further level 2,3,4,5 ... n to be controlled. At least one 1,2,3,4,5 ... or n (see FIGS. 3,4 or 5) of the light modulating levels includes light responsive elements 34, 36a, 36 for modifying the light transmissivity of the light transmissive elements 31 in response to the light incident on that level 1,2,3,4,5 ... n. The final further light intensity modulating level n has a display screen D (see FIG. 2) for displaying an output two-dimensional image derived from the input two-dimensional image and modified by the sequence of light intensity modulating levels 1,2,3,4,5 ... n when the operating light beam 0 is incident on the first level.

The general construction and function of an optical data processing device in accordance with the invention will now be described with reference to FIGS. 1 to 5.

Figure 1:
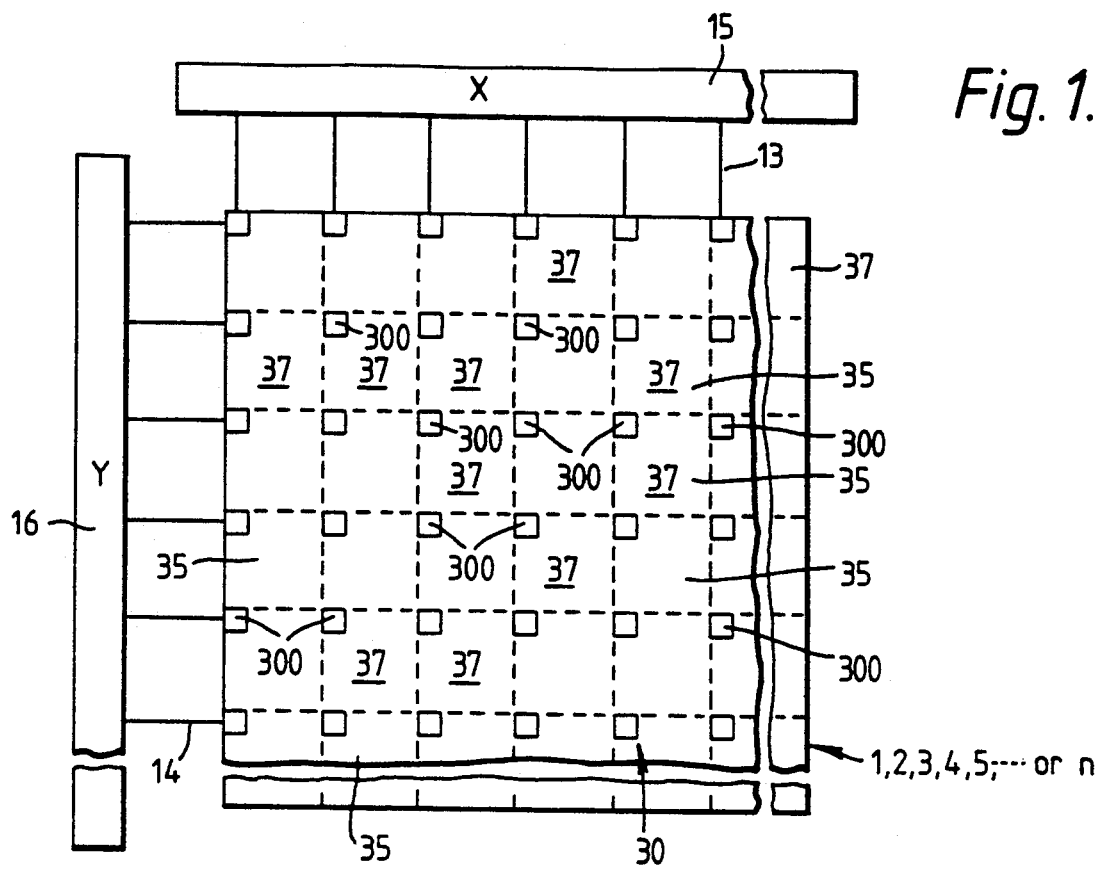
FIG. 1 is a schematic simplified plan view, part broken-away, of a light intensity modulating level of an optical data -processing device in accordance with the invention.

FIGS. 1 and 2 illustrate very schematically an optical data processing device 100 in accordance with the invention, with FIG. 1 showing a schematic plan view of a typical on of levels 1,2,3,4,5 ... or n and FIG. 2 showing a schematic cross-sectional view, part broken-away, of the device 100.

As illustrated schematically in FIG. 1, a typical one of the light intensity modulating levels 1,2,3,4,5, ... n comprises a matrix 30 of matrix cells 35 indicated by dashed boundary lines in FIG. 1. Each matrix cell has an element of controllable light transmissivity and means for controlling the light transmissivity of that element. These will be described in greater detail below with reference to the examples given in FIGS. 3,4 and 5 but, for the sake of simplicity, each controllable light transmissivity element and its associated control means is shown simply as a light modulating block area 300 in the plan view of FIG. 1. As can be seen most clearly from FIG. 1, each light modulating block 300 does not occupy the whole of each matrix cell 35. Rather, each light, modulating block 300 may occupy about 10 to 20% of the area of its matrix cell 35. The remainder of each matrix cell 35 provides an area 37 of predetermined light transmissivity for allowing, as will be explained below, an operating light beam 0 providing a uniform background illumination to pass through the levels 3,4,5 ... n without being modulated. Generally, the operating light beam will be a white light beam. However, it may be possible to use light of a given wavelength or wavelengths. If the light modulating levels 1,2,3,4,5, ... n have appropriate transmission properties the operating beam need not be a visible light beam but could be formed of light in the near infra-red or ultra-violet wavelengths.

As shown in FIG. 1, the light modulating blocks 300, in particular the controllable light transmissivity elements of the light modulating blocks, are connected in rows and columns 13 and 14 via which a particular controllable light transmissivity element may be addressed electrically via the control means, as will be described below, using X and Y control/addressing circuits 15 and 16. In addition, at least one of the light modulating levels 1,2,3,4,5 ... or n is provided with means responsive to light incident on that level for allowing the transmissivity of the controllable light transmissivity elements of that level to be controlled, at least partly, in response to the light incident thereon. In this particular case, each level 1,2,3,4,5, ... n may be provided with such light responsive means. Specific examples of such light responsive means will be described below with reference to FIGS. 3 to 5.

Typically, there may be about six light modulating levels. As illustrated schematically in FIG. 2, the light modulating levels 1,2,3,4,5, ... n are formed one after another so that, although not shown in FIG. 2, the light modulating blocks 300 are vertically aligned through the structure.

The precise structure of the circuit of each spatial light intensity modulating level 1,2,3,4,5 ... n will depend on the desired modulating function to be carried out by that particular level 1,2,3,4,5, ... n.

An example of one particular circuit structure which may be used, for example, at least for the first spatial light modulating level, is shown in FIG. 3. It will be appreciated that, in this particular example, as each matrix cell 35 is to be identical, only four of the many, typically 350,000, matrix cells 35 provided at the first level are shown.

In this example, each controllable light transmissivity element comprises a liquid crystal element 31 of a conventional type, although other suitable controllable light transmissivity elements could be used. The liquid crystal elements 31 are connected in rows and columns 13 and 14 via respective switching elements 32 enabling a particular liquid crystal element to be addressed by signals from appropriate conventional X and Y control-/addressing circuits 15 and 16. The switching elements 32 may, as shown, be thin film field effect transistors (FET's) with the gates addressable via the control/addressing circuit 16 to enable any voltage on the associated column line 13 to be supplied to the liquid crystal element 31 to modify its light transmission properties.

In addition to each liquid crystal element 31 being electrically individually addressable and controllable via the X-Y control/addressing circuits 15 and 16 and switching elements 32 described above, in the arrangement shown in FIG. 3 each liquid crystal element 31 is associated with a respective light responsive element 34 which may be, for example, in the form of a photosensitive diode provided at the first level 1 and associated with a respective switching element 33 again, in this example, a thin film FET. It will of course be appreciated that other suitable switching elements, such as diodes, may be used in place of the thin film FET 32 and 33.

Each photosensitive diode 34 is arranged, in the example shown in FIG. 3, to detect light incident on the associated matrix cell 35 and, when the gate of the associated switching element 33 is addressed, to supply a voltage signal to the associated column line 13, via the switching element 33. Thus when the gates of the switching elements 32 and 33 associated with a particular matrix cell 35 are addressed by the Y control/addressing circuit 16 via the associated row line 14, any voltage supplied by the X control/addressing circuit 15 and/or via the light sensed by the photosensitive diode 34 is supplied to the liquid crystal element 31 of that matrix cell 35, via the associated switching element 32, to modify the light transmission properties of the liquid crystal element 31.

In this example, the liquid crystal elements 31 are formed by a twisted nematic liquid crystal sandwiched between crossed polarisers so that, in the absence of a voltage applied across the electrodes associated with the liquid crystal element, the liquid crystal rotates the plane of polarisation of incident light through 90° and so the liquid crystal element appears bright. Applying a voltage across the liquid crystal decreases the degree of twist and so also decreases the degree of polarisation rotation so that the liquid crystal element appears darker.

As mentioned above with reference to FIG. 1, each matrix cell 35 also comprises an area of predetermined transmissivity 37 which allows, as will be explained below, light to pass through without modulation. In this example, the areas of predetermined transmissivity 37 are formed by areas of the twisted nematic liquid crystal sandwiched between crossed polarisers but without electrodes or electrical connections so that no voltage is applied across the areas 37 of predetermined transmissivity which thus appear bright regardless of the voltages applied to the liquid crystal elements 31.

In the interests of clarity the proportion of the area of a matrix cell 35 occupied by the light modulating block 300 has been shown considerably enlarged in FIG. 3 (and also FIGS. 4 and 5 below). Typically about 80 to 90% of the area of the matrix cell or pixel 35 will be occupied by the area 37 of predetermined transmissivity and thus only 20 to 10% by the light modulating block 300.

The above description with reference to FIG. 3 gives an example of the circuit structure of a typical light modulating level 1,2,3,4,5, . . . n. It will of course be appreciated that a light modulating level may have a different circuit structure, some examples of which will be described below, depending upon the desired manner in which that level is to modulate the incident light.

FIG. 2 is a cross-sectional view of an optical data processing device embodying the invention which shows the manner in which the light modulating levels 1,2,3,4,5 . . . n are stacked one upon another. In the interests of clarity only the polarising layers 38,39 are shown hatched.

The structure shown in FIG. 2 is manufactured using known techniques developed for liquid crystal display devices. Thus, the first level 1 comprises a glass substrate 10 which carries on one surface a polarising layer 38 and on the other the active layer 11 of the first level 1, that is the layer which includes the liquid crystal and electrodes (not shown) defining the matrix 30 of liquid crystal elements 31 and area 37 of predetermined transmissivity and also of course the switching elements 32,33, photosensitive diodes 36 and associated connections. The active layer 11 is covered by a further glass layer 12 and then a second polarising layer 39 which has a plane of polarisation rotated through 90° with respect to the polarising layer 38 so that the polarising layers 38 and 39 are crossed.

The polarising layer 39 also forms one of the crossed polarising layers 39 and 38 of the second light modulating level 2. The second light modulating level 2 similarly comprises a glass substrate 10, an active layer 11, a further glass layer 12 and finally a polarising layer 38 which forms a crossed polariser pair with the preceding polarising layer 39. Each of the subsequent light modulating levels 3,4,5, . . . n is formed of a similar structure of layers although, of course, the actual circuit structure of the active layer 11 will depend upon the desired function of that light modulating level. Each level 1,2,3,4,5 . . . n comprises the necessary electrical connections to the active layer 11 to enable connection to the associated X and Y control/addressing circuits 15,16 for which the outputs $X_1$, $X_2$, $X_n$ to the X control-/addressing circuits 15 are indicated schematically in FIG. 2.

The final polariser 39a may form part of a display screen D of known type. Alternatively, or additionally, the final image at the final level n may be output as a video signal by providing a light sensing level (not shown) after the final light modulating level n. The light sensing level may be similar in structure to the level 1,2,3,4,5 . . . or n shown in FIG. 3 but with the liquid crystal elements 31 and associated switching elements 32 omitted so that the charge stored by the photosensitive diodes 34 representing the light incident on the matrix cells is read by the X and Y control/addressing circuits via the switching elements 33 and supplied as a video signal which may be supplied back as the input data signals for the first levels or may, for example, be supplied to further equipment, for example a computer or cathode ray tube.

The display screen D provided by the final level n or the display monitor may be provided with feedback means to enable an operator to alter the modifications made by the further levels 2,3,4,5 ... n. Thus, for example, the display screen or display monitor may have a touch sensitive surface or may be connected to a suitable input device (mouse, trackerball, keyboard) which enables information to be input by an operator to alter the modifications made by the further levels, for example so as to block out part of the final output optical image or to increase or decrease contrast etc.

The intensity of light from the operating light beam 0 reaching a given level 2,3,4,5 ... n, will of course decrease for the levels further from the first level 1 on which the operating light beam 0 is incident. Accordingly, in order to provide sufficient light intensity for the operation of the later levels 2,3,4,5 ... n the optical data processing device 100 may be provided, as shown in FIG. 2, at intervals with a deflecting layer 40 which in this example is in the form of a birefringent layer formed of a suitable material having electrically controllable birefringent properties which, when an appropriate signal is supplied via line 41, acts to refract the portion of the operating light beam 0 passing through the area of predetermined transmissivity 37 of a given matrix cell 35 of, in this example, the third light modulating level 3 towards the light modulating block 300 of the corresponding matrix cell 35 of the following light modulating layer 4. Where such a deflecting layer 40 is provided it is of course necessary for the optical pattern stored by the matrix of liquid crystal elements of the light modulating level 3 preceding the birefringent layer 40 to be electrically transferred to the matrix 30 of liquid crystal elements 31 of the light modulating level 4 succeeding the birefringent layer 40. This may be achieved by providing, prior to the birefringent layer 40, a light sensing level 42 which is structurally similar to the circuit shown in FIG. 3 with the exception that the liquid crystal elements 31 and associated switching elements 32 are omitted. In this case the photosensitive diodes 36 sense the optical pattern on the preceding light modulating level, for example level 3, and the charge stored at the photosensitive diodes 36 is sensed via the switching elements 33 and X and Y control and addressing circuits and is supplied electrically to the next level, in this example level 4, succeeding the birefringent layer 40, so as to provide at level 4 refresh or repeat of the optical image stored at the third level 3. The supply of the electrical signals representing the optical image at the third level 3 to the fourth level 4 is achieved via suitable conventional circuitry and is indicated merely schematically in FIG. 2 by means of a line 43 connecting the light sensing level 42 to the control/addressing circuit lines of the fourth level 4. The electrical signals may, of course, be modified electrically so as to modify the two-dimensional image before supply to the X and Y control/addressing circuits 15 and 16 of the fourth level.

Where the first level 1 has the structure shown in FIG. 3, the input data signals representing the image which is to be processed may be provided as electrical input signals via the X and Y control/addressing circuits 15,16 which set the status of the liquid crystal elements and/or by detection of a two-dimensional optical image incident on the first level 1.

It will of course be appreciated that the input data signals may be supplied both electrically via the X and Y control/decoding circuits 15,16 and switching elements 32 and optically via the photosensitive diodes 34 and switching elements 32 and 33 from an optical pattern incident on the first level 1, so that the electrical signals act to modify the optical pattern stored at the first level 1 in a predetermined desired manner. Of course, if it is desired for the first level I of the optical data processing device to respond merely to electrical input data signals then the light responsive elements 34 and associated switching elements 33 may be omitted from the first level 1, although this would reduce the flexibility of the device.

An optical pattern is thus stored at the first level 1 in response to the input electrical and/or optical data signals. When an operating light beam 0 which is preferably a uniform intensity parallel light beam is incident on the first level 1, the first level 1 provides an input two-dimensional image which is then incident on the second light modulating level 2. The manner in which the input two-dimensional image is modified by the second level 2 will of course depend on the precise circuit structure of the second level 2 and also on any electrical input data signals supplied to the second level 2.

The second level 2 may, of course, be identical in structure to the first level 1, in which case light responsive elements 34 will sense the incident two-dimensional image and set, via the switching elements 32 and 33, the voltage applied to the liquid crystal elements 31 accordingly. These voltages may of course be modified by electrical signals applied to the liquid crystal elements 31 via the associated switching elements 32 and X-Y control/decoding circuits 15 and 16 so that for example certain of the liquid crystal elements 31 may be set to be opaque by means of the electrical signal thereby blocking out part of the two-dimensional image.

The following levels 3,4,5 ... n may similarly be of identical structure to the first level I and again modifications to the optical pattern passing through the optical data processing device may be caused by electrical data input signals to the respective X and Y control/decoding circuits 15,16 of the further levels 2,3,4,5, ... n.

Figure 4:
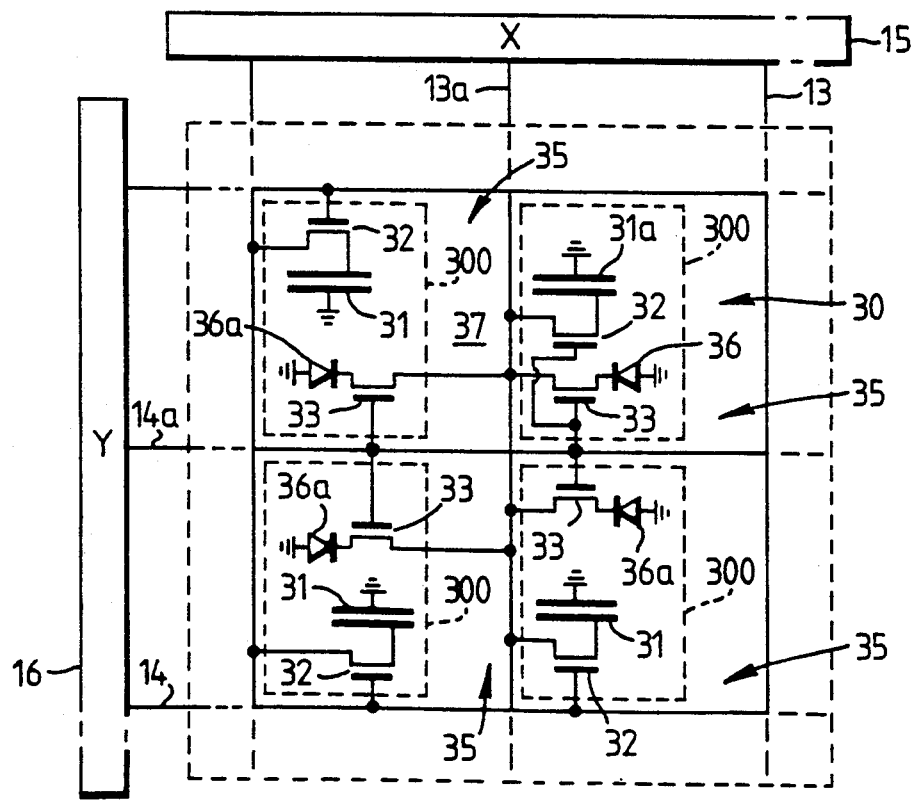
FIGS. 4 and 5 are schematic circuit diagrams for illustrating different forms of matrix cells for a light-modulating level of an optical data processing device in accordance with the invention.
Figure 5:
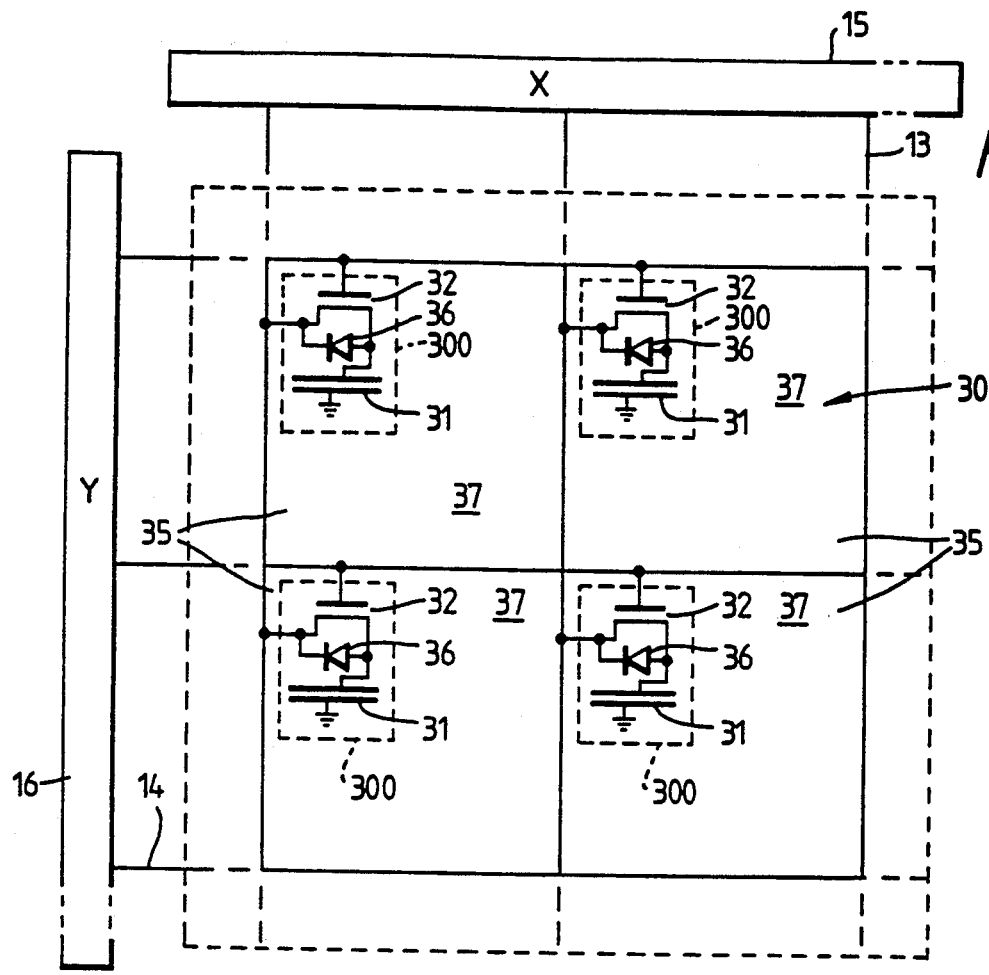

FIGS. 4 and 5 illustrate two of many possible different circuit structures for light modulating levels 1,2,3,4,5, ... n of a device in accordance with the invention. It will be appreciated that the circuit structures shown in FIG. 4 and 5 may be adopted for one or more of the levels 1,2,3,4,5 ... n and moreover that the circuit structure for each light modulating block 300 of a level need not be identical. Again, only four adjacent matrix cells 35 are shown although each level will consist of, typically, 350,000 such cells 35.

In the circuit structure shown FIG. 4, four adjacent matrix cells 35 are shown each of which has a light responsive element within its light modulating block 300. In this example, however, the light responsive elements 36a of three of the light modulating blocks 300 are connected via respective thin film transistors 33 not to control the associated liquid crystal element but rather to control the remaining one 31a of the four liquid crystal elements. Thus, each of the three photosensitive diodes 36a and also the fourth 36 are connected via their associated thin film transistors 33 to the column line 13a associated with the liquid crystal element 31a, whilst the gates of the four thin film transistors 33 are connected to the row line 14a associated with that liquid crystal element 31a. As shown each of the three remaining liquid crystal elements 31 is connected to the associated row and column lines 13 and 14 via a respective switching element 32 so as to be electrically controllable via the X and Y control/addressing circuits 15 and 16.

In this example, one liquid crystal element 31a is controlled in accordance with the sum of the light intensities received by its own light responsive elements 36 and the other three light responsive elements 36a. Alternatively the average, by using appropriate resistive divider circuits, of the intensity detected by all of the four light responsive elements may be used. If such a circuit structure were to be repeated over the entire further level, this would have the effect (in the absence of any modifying electrical signals supplied to the associated X and Y control and addressing circuits 15 and 16) of reducing or coarsening the resolution of the image by a factor of, in this case, four. Although not shown in FIG. 4, each liquid crystal element 31 and 31a could by appropriate repetition of the photosensitive diode 36 and switching element 33 circuitry be controlled by the sum or the average of the light incident on two, three or more adjacent matrix cells 35 or by some weighted mean thereof.

FIG. 5 shows an alternative arrangement where a liquid crystal element 31 is associated with a light responsive element 36 of a specially selected size arranged in parallel with the source and drain connections of the FET switch element 32. In this case, the voltage on the liquid crystal element is set merely according to the incident light intensity received by its associated light responsive element 36 and is weighted in accordance with the area of the light responsive element 36. Such area may differ for light modulating blocks 300 of the same level.

Each of the examples shown in FIGS. 3,4 and 5 is of necessity a hardwired structure and so no modification can be made in a particular device structure of the response to incident light patterns except by electrical control via the X-Y control/addressing circuits 15 and 16.

It may however be possible to arrange for electrical control of the connection of the light responsive elements or photodiodes 36 to enable the particular circuit to be selected as desired. Thus, for example, taking the case of the structure of FIG. 4 where the light intensity received by four adjacent light responsive elements 36, 36a controls the voltage set at one liquid crystal element 31a, it may be possible by having further addressing lines or electrically controlled optical shutters (LCD's) for the light responsive elements or photodiodes to control which and how many of the photodiode output signals are used to control a particular liquid crystal element 31.

In operation of an optical data processing device in accordance with the invention, input data signals are stored at the first level 1 either electrically by use of the X and Y control/addressing circuits 15 and 16 and associated switching elements 32 or optically by sensing, using the photosensitive diodes 36 and associated switching elements 32 and 33, a two-dimensional optical image incident on the first level 1. Once the input data signals have thus been stored at the first level 1, an appropriate operating light beam 0 is shone onto the first level 1 to establish an input two-dimensional image at level 1 which is then incident on the second level 2. Depending upon the circuit structure of the second level 2 and the control signals applied thereto, the input two dimensional image is modified by the second light modulating level 2 and supplied as a modified two-dimensional image to the third level 3. In this example, after modification at the third level 3, the modified two-dimensional image is sensed by the photosensitive elements of the light sensing level 42 and the charge stored on the photosensitive elements read electrically via appropriate X and Y control/addressing circuits and supplied to the fourth level 4 to provide at the fourth level 4 a pattern corresponding exactly to that stored at the third level 3. The deflecting or birefringent layer 40 between the third and fourth levels 3 and 4 acts to refract light passing through the areas 37 of predetermined transmissivity of the third level 3 onto the light modulating blocks 300 of the fourth level so increasing the intensity of the light incident on the fourth level and allowing further processing to continue at fifth, sixth etc. levels 5,6. Where the final level provides merely a two dimensional output image, then the final level n may have each matrix cell 35 completely filled or occupied by the liquid crystal element 31 and its associated switching circuitry, that is so that there are no areas 37 of predetermined transmissivity at the final level n. The final level n provides a modified output image in which the optical information at each pixel or matrix cell 35 has been modulated by the various levels 2,3,4,5 ... n in parallel with the optical information at each other pixel or matrix cell 35.

Although it is assumed in the discussion above that the optical data processing device is concerned with processing of black and white or grey scale images this need not necessarily be the case. Thus, where the original image is input as electrical data signals, then a colour image may be reproduced simply by providing the final level n with appropriate colour filters layers to define a matrix of R,G,B (red, green, blue) cells in a manner similar to a colour liquid crystal display. Where the original image is input as a colour image then each matrix cell 35 of the first level 1 may be replaced by three matrix cells 35 each receptive (by use of appropriate filters) to only a respective one of red, green and blue colour signal so converting the colour image to a grey scale. Alternatively, it may be possible to process the red, green and blue image signals sequentially. The use of colour filters at the final level n in a manner similar to that just discussed would reconstitute the colour image from the grey scale.

The discussion of the uses of the optical data processing device given above has concentrated on the processing or modification of optical images. However, the parallel processing capability of an optical data processing device in accordance with the invention is suited to many other purposes such as the parallel processing of optically encoded data bits which can subsequently be supplied as electrical signals to further processing equipment.

One other example of a possible use of the device is to make a system capable of data compression so that electrical or optical data or image data received by the device at N bits per second can be encoded and transmitted, for example via telephone lines or a radio link, at N/8 bits per second so enabling information, especially images, to be transmitted at lower bandwidth to a receiving station where a suitable decoder, for example another optical data processing device provided with the information concerning weighting factors and formatting used can be used, to reconstruct the image.

Figure 6:
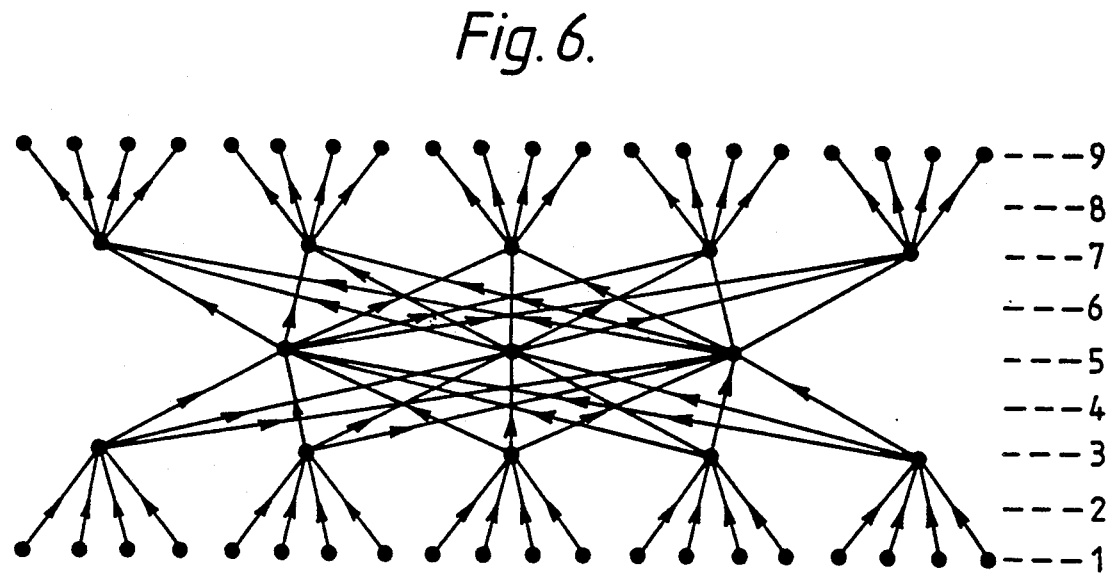
FIG. 6 is a schematic diagram for illustrating the use of an optical data processing device in accordance with the invention to provide data compression.

FIG. 6 illustrates in a schematic manner the operations which may be involved. As shown in FIG. 6 N bits of information input to the first level 1 of an encoding optical data processing device are weighted electrically at the secondlevel 2, this data is then compressed at the third level 3 which has a structure similar to that shown in FIG. 4 and so sums four adjacent bits. A weighting factor is again electrically added at the fourth level 4 and adjacent four bits are summed at the fifthlevel 5 which may again have a structure similar to that shown in FIG. 4.

The fifth level 5 thus provides a data signal which is compressed by a factor of sixteen and can be read electronically and then be transmitted to a receiving station using suitable transmitting equipment. The succeeding levels 6,7,8,9, of the encoding device effectively reverse the data compression process and enable,the decompressed image provided at level 9 to be compared with the original image and the weighting factors adjusted until the best possible match is achieved.

In this case the further levels 7 and 9 which split a single compressed bit into four bits will have a circuit structure in which, instead of as in the FIG. 4 arrangement in which the outputs of four photodiodes are summed to control one liquid crystal element, the output of one photodiode is divided to control four adjacent liquid crystal elements.

Once the encoding device weighting factors have been determined, then a decoding optical data processing device having the structure of further levels 5 to 9 provided at the receiving end should be able to reconstruct the original image from the compressed data. The weighting factors at levels 6 and 8 will have been determined as described above at the corresponding levels 6 and 8 of the encoding device. Such an arrangement does not require any electrical weighting or modulation of the optical data and the required weighting factors, for a given pair of transmitting and receiving optical data processing devices, can be set during manufacture. An advantage for the receiving device is that the input data would be compressed and the final further level would show the full video image whilst requiring 1/16$^{th}$ of the connections normally necessary for such an image.

Although in the examples described above, each light modulating level has means for controlling the controllable light transmissivity elements both electrically and optically, this need not necessarily be the case and, for example one or more of the levels 1,2,3,4,5, . . . n may have controllable light transmissivity elements which are controlled solely by the electrical signals provided by the X and Y control/addressing circuits 15 and 16 and associated switching elements 32 in which case the photodiodes 36 and any associated switching elements could be omitted from that level. Also, one or more of the levels 1,2,3,4,5 . . . n may have controllable light transmissivity elements which are controlled purely optically by means of the photosensitive diodes 36 in which case the X and Y control/addressing circuits and associated switching elements 32 may be omitted from that level.

From reading the present disclosure, other modifications or variations will be apparent to persons skilled in the art. Such modifications or variations may involve other features which are already known in the art and which may be used instead of or in addition to features already described herein.

I claim:

1. An optical data processing device comprising:
   a sequence of light modulating levels, each such level consisting of a substrate carrying a matrix of elements of controllable light transmissivity, each light transmissive element having control means associated therewith for controlling the transmissivity thereof in accordance with signals supplied to such control means;
   means for supplying input data signal to the control means of the light transmissive element in the first modulating level so as to form a pattern of transmissivities at said first level which, when a light beam is incident thereon, results in formation at that level of a two-dimensional input image representing the input data signals;
   the control means of the light transmissive elements in at least one of the modulating levels comprising switching elements for modifying the transmissivities of the associated light transmissive elements in accordance with electrical data signals supplied to such switching elements;
   control means of the light transmissive elements in at least one of the further modulating levels following the first modulating level comprising light responsive elements for modifying the transmissivities of the associated light transmissive elements in accordance with the light pattern incident on such at least one modulating level and which was formed by the immediately preceding modulating level; and
   the final modulating level comprising a display screen on which is formed, in response to a light beam incident on the first modulating level, a two-dimensional output image corresponding to said input image as modified by the pattern of light transmissivities of all of the sequence of modulating levels.

2. A device according to claim 1, wherein the first level comprises light responsive elements for modifying the light transmissivity of the light transmissive elements in response to light incident on the first level.

3. A device according to claim 2, where each light transmissive element of the first level has associated therewith a respective light responsive element and means are provided for causing the pattern to be stored at the first level in response to an input light beam incident on the light responsive areas.

4. A device according to claim 1, wherein at least one of the further levels after the first level has a group of light responsive elements for providing a signal to modulate the light transmissivity of at least one light transmissive element in response to the light incident on said group of light transmissive elements.

5. A device according to claim 1, wherein at least one of the further levels after the first level has at least one light transmissive element associated with a light responsive element and means are provided for controlling the transmissivity of the said at least one light transmissive element of that level in response only to the light incident on the said light responsive element.

6. A device according to claim 1, wherein each level comprises a matrix of cells and each cell comprises a controllable light transmissive element and an area of predetermined transmissivity for allowing passage of the operating light beam.

7. A device according to claim 6, wherein a deflection layer is provided between selected ones of the further levels after the first level for deflecting the portion of the input light beam passing through the area of predetermined transmissivity of a matrix cell onto the light transmissive element of the corresponding matrix cell of the next further level.

8. A device according to claim 7, wherein a light sensing level comprising light responsive elements is provided between one selected further level and the deflection layer for sensing a pattern stored at the one selected level and for providing data signals to the light transmissivity control elements of the other selected further level for enabling the pattern stored at the one selected further level to be produced at the other selected further level.

* * * * *